United States Patent Office 3,217,961
Patented Nov. 16, 1965

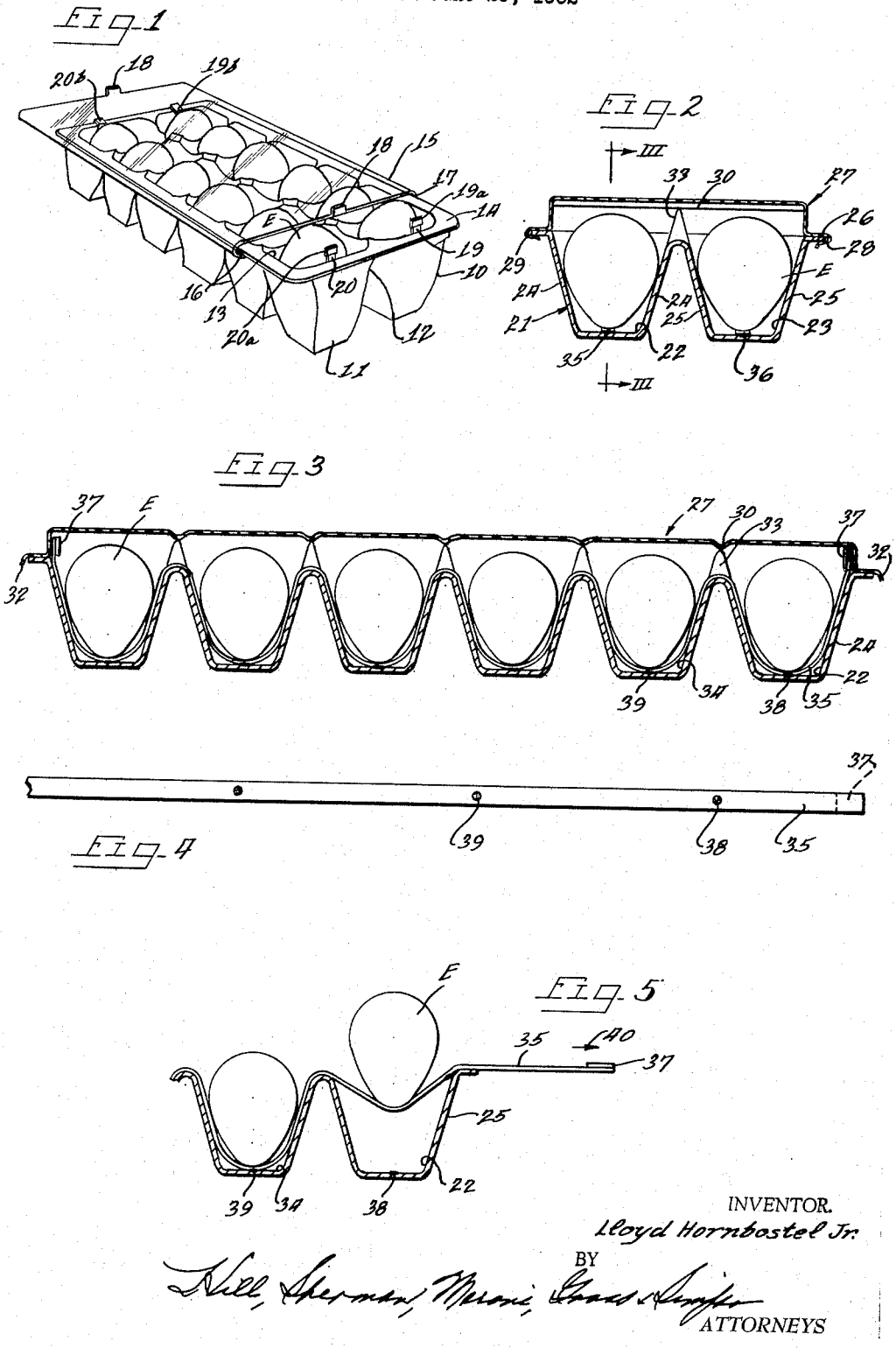

3,217,961
MOLDED EGG CARTON
Lloyd Hornbostel, Jr., Beloit, Wis., assignor to Beloit Corporation, Beloit, Wis., a corporation of Wisconsin
Filed June 25, 1962, Ser. No. 204,704
4 Claims. (Cl. 229—2.5)

The present invention relates to an improved container and more particularly to a container for holding a plurality of individual objects such as eggs and protecting them during shipment and storage and providing means for easily removing the eggs from the container.

In existing commercially used egg cartons a plurality of eggs are held in individual relatively shallow pockets to project upwardly with about 50% of the egg exposed when the carton is opened. Removal of the egg is difficult due to the tapered shape of the shell and the smooth outer surface of the egg. Further, the surface of the egg where it rests against the shell often becomes moist causing an adhesion between the shell of the carton and it is necessary to break this adhesion to remove the egg and frequently the egg shell is broken during removal.

Because of the substantial area of egg exposed above the carton, the breakage of eggs at the store and in the home is substantial. The upper portion of the carton is relied upon to protect the upper end of the egg, but this protection is removed as soon as the carton is opened, and it is necessary with conventional egg cartons to raise the cover to observe the eggs therein. A carton which splits vertically facilitates removal of the egg, but does not afford adequate protection, and will leak in the event of a broken egg. Split cartons are also difficult to manufacture.

It is accordingly an object of the present invention to provide an improved carton suitable for holding a plurality of individual objects such as eggs, and for protecting the objects within the carton, and providing means for easily removing individual eggs from the carton.

A further object of the invention is to provide an improved egg carton which may be fabricated of molded pulp and which provides individual egg receptacles made deeply enough to accommodate two-thirds of the egg in order to provide maximum protection therefor, wherein a cover is provided which may be formed of a transparent material so as to provide a view of the contents of the carton.

A further object of the invention is to provide a means for removal of individual eggs from the carton preferably in the form of a tape which extends down into individual pockets in the carton beneath the egg and which may be pulled to elevate the egg from the carton.

Other objects, advantages and features will become more apparent with the teaching of the principles of the invention in connection with the disclosure of the preferred embodiment thereof, in the specification, claims and drawings, in which:

FIGURE 1 is a perspective view of a carton for objects such as eggs, constructed in accordance with the principles of the present invention;

FIGURE 2 is a vertical sectional view taken crosswise through a carton of modified construction;

FIGURE 3 is a vertical sectional view taken substantially along line III—III of FIGURE 2;

FIGURE 4 is a bottom plan view of a tape for lifting the eggs from the carton in accordance with the principles of the invention; and FIGURE 5 is a fragmentary sectional view showing an egg being removed.

As shown on the drawings:

FIGURE 1 illustrates an egg carton or container with a container base member 10 having a plurality of interconnecting egg-supporting sections such as 11 and 12 each with an egg-receiving pocket or well 13 therein. The egg-receiving wells are of a depth to receive the major portion of the egg and support the egg in an upright position. In the arrangement of FIGURE 1 the wells are sufficiently deep so that the upper edge of the container base member 10 extends at least to the top and preferably slightly higher than the top of the eggs E.

At the top of the base member is an outwardly extending flange 14 which has an upper planar surface and supports a cover 15. The cover has downwardly and inwardly turned flanges on each side to provide a slide so as to slide over the flange 14 of the base member 10 so that the cover can be slid partially or completely off of the base member for removing the eggs. Upwardly turned tabs 18 are formed on each end of the cover to facilitate manual sliding.

As will be observed, the eggs are supported upright in each of the wells and cannot be gripped laterally. Means are provided for lifting or elevating individual eggs from the wells, and for this purpose elongated tapes 19 and 20 are positioned on each side of the carton and extend downwardly into each of the wells beneath each of the eggs. At the end of the tapes are pull tabs such as 19a and 19b for the tape 19, and 20a and 20b for the tape 20. As will later become more clear, as the pull tabs are pulled individual eggs are successively elevated from the wells so that they can be manually gripped.

The container base member 10 is conveniently manufactured of pulp, and a good quality of Bleached Kraft and groundwood for the container provides a well suited carton. The cartons may be made by various mechanisms such as disclosed in the copending application Modersohn and Hornbostel, Jr., entitled, "Mold," U.S. Serial No. 89,451, filed February 15, 1961. A colored pulp may be used to provide an attractive colored container.

The container top 15 is formed of a suitable preferably transparent material such as polyethylene formed by a vacuum forming process, or other plastic material is acceptable. Brands and other data can be printed on the cover.

In FIGURES 2 and 3 a similar construction is shown differing from the construction of FIGURE 1 in that the cover has a slight depth at the side.

The container has a base member 21 with rows of pockets or wells 22 and 23 for receiving eggs E in upright position. Side walls 24 and 25 of the wells hold the eggs upright and are tapered so that the egg is preferably supported with its smaller end in the base of the well. At the upper edge of the base member around the outer periphery of the carton is an outwardly extending flange 26.

Mounted on the base member 21 and supported on the flange 26 is a removable cover 27 with downwardly and inwardly turned slides 28 and 29 for sliding the cover over the flange. These slides may be lifted outwardly for lifting the cover off the carton. At the ends of the cover are downwardly turned lips 32 which in some cases may be bent upwardly for sliding the cover on the base. At the center of the carton are spaced peaks 33 which engage and support downwardly projecting ribs 30 on the cover 27. These peaks are shown as being centrally located, but in some constructions may be in the form of a ridge extending down the center of the carton, or also may include laterally extending ridges. The cover is formed of a clear material such as polyethylene or other plastic as above described in connection with the structure of FIGURE 1.

For lifting the eggs from the deep pockets which cover the major portion of the eggs E and making it possible to grip them laterally, tapes 35 and 36 are arranged to extend longitudinally along each side of the container base member and to extend downwardly into each of the wells beneath each of the eggs E, so as to cradle the eggs within the loops of tape extending beneath the eggs.

As illustrated in FIGURE 3, at the ends of the tape 35 are pull tabs 37 so that the tape can be gripped and a pulling force applied to the tape to lift the eggs from the wells.

The tape is releasably held in the base of each of the wells such as by a small area or dot of pressure-sensitive adhesive, as illustrated at 38 and 39 in the base of the wells 22 and 34.

The tape 35 is illustrated in FIGURE 4, and the action of the tape in elevating individual eggs from the wells is illustrated in FIGURE 5. As the tape is manually gripped at the pull tab 37 and pulled outwardly, as indicated by the arrowed force line 40, the pressure-sensitive adhesive 38 breaks to permit the tape to rise out of the bottom of the well and lift the egg E. The sides of the egg E are then exposed so that it may be gripped manually. A continued pull on the tape will separate the tape from the bottom of the well 34 separating the next pressure-sensitive adhesive spot 39 from the container, and the next egg will then be lifted. With this arrangement, the eggs are sequentially elevated so that each one can be manually lifted out of the carton before the next one is raised.

The tape also functions to provide an added support or buffer for the eggs within each of the wells, and the tape helps maintain the eggs in a centered position so that there is less chance of the eggs adhering to the side walls should the shell of the egg be wet. Further, as a force is applied to the tape, the tape tends to center the egg in the well before lifting it.

The pressure-sensitive adhesive dots 38 and 39 may be provided on the tape before it is situated within the wells in the base member 25, or adhesive spots may be placed in the base of the container and the tape forced down upon the adhesive.

Thus it will be seen that I have provided an improved carton or container well suited for the storage and protection of eggs, which meets the objectives, features and advantages above set forth. The container with its deep wells provides side walls that protect the sides of the eggs during storage, and yet it is as easy or easier to remove eggs from the container than from cartons of the types heretofore available.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. An egg container comprising, a container base member having a plurality of egg-receiving wells each of a depth sufficient to receive the major portion of an egg so that it cannot be gripped laterally, an elongated continuous tape extending into the bottoms of a plurality of adjacent wells with an end of the tape projecting above the well for gripping and applying a pulling force to lift the eggs from the wells, said wells having tapered lateral walls which act in cooperating relationship with said tape to uprightly support the eggs during their elevation therefrom, and a small area of pressure-sensitive adhesive between the material of the base member and the tape at the bottom of the wells so that as a pulling force is applied to said end of the tape the eggs will be successively lifted with successive separation of the tape from the successive wells.

2. An egg container comprising, a shaped container base of suitable supporting material such as molded pulp having a plurality of relatively deep pockets separated by tapered walls and each being sufficiently deep to receive the major portion of an egg so that it cannot be gripped laterally, a transparent cover slidably supported on said base above the ends of the eggs, an elongated tape extending over the tops of said walls and down to each of the pockets, said pockets having tapered lateral walls which act in cooperating relationship with said tape to support the eggs during their elevation, a pull tab end on the end of the tape, and a pressure-sensitive adhesive between the tape and the base of each of the wells.

3. A container for individual objects such as eggs comprising, a container base member having a plurality of egg-receiving wells therein with tapered side wall means for laterally supporting an egg, an elongated tape means extending into the wells from one side of the eggs and projecting upwardly at the opposing side of the eggs in the wells to be pulled for successively elevating the eggs in the wells, said tapered wall means cooperating with said tape means to uprightly support an egg during the elevation thereof, and means in base of the wells releasably holding the tape means on the container base within the wells.

4. An egg container comprising, a container base member having egg-receiving wells therein with tapered side wall means for laterally supporting eggs, an elongated tape means extending into the wells from one side of the eggs and projecting upwardly at the opposing side of the eggs in the wells to be pulled for successively elevating the eggs, said wells having suitably tapered walls which act in cooperating relationship with said tape means to uprightly support the individual eggs during their elevation therefrom, the said tape means providing a cushion between the base of the well and the eggs, and an area of force-releasable adhesive between the tape means and the container at the base of the well so that the tape means will be held in the well and will separate from the base member as it is pulled.

References Cited by the Examiner

UNITED STATES PATENTS

| | | | |
|---|---|---|---|
| 1,144,559 | 6/1915 | Mendelson et al. | 206 |
| 1,162,560 | 11/1915 | Brady | 229—7 |
| 1,167,783 | 1/1916 | Roikjer | 229—29 |
| 1,990,145 | 2/1935 | Swift | 229—29 |
| 2,001,798 | 5/1935 | Schreiber | 229—48 |
| 2,194,828 | 3/1940 | Greaves | 206 |
| 2,803,376 | 8/1957 | Kampff | 206 |
| 2,974,842 | 3/1961 | Reifers | 229—29 X |
| 2,975,889 | 3/1961 | Brown. | |

GEORGE O. RALSTON, *Primary Examiner.*